Aug. 11, 1953  E. K. DOMBECK  2,648,404
BRAKE
Filed Feb. 24, 1951  3 Sheets-Sheet 3

INVENTOR.
EDWARD K. DOMBECK
BY
*G. A. Gust*
ATTORNEY

Patented Aug. 11, 1953

2,648,404

UNITED STATES PATENT OFFICE 2,648,404

BRAKE

Edward K. Dombeck, South Bend, Ind., assignor to Bendix Aviation Corporation, South Bend, Ind., a corporation of Delaware Application February 24, 1951, Serial No. 212,649

13 Claims. (Cl. 188—78)

1

The present invention relates to brakes and more particularly to internal expanding, drum type brakes.

The primary object of this invention is to provide a simple, inexpensive, and reliable brake which will produce effective and consistent stopping power regardless of the direction of drum rotation or of vehicle movement.

Another object of this invention is to provide a brake which will develop substantially the same braking power regardless of the direction of drum rotation for a single, given amount of brake actuating movement. Thus, a brake of this invention utilized on an automotive vehicle would produce the same braking power in both forward and reverse directions of vehicle travel for a given movement of the brake pedal.

Other objects will become apparent as the following description proceeds.

In the drawings:

Figure 3 is an illustration of the actuating mechanism;

Figure 1:
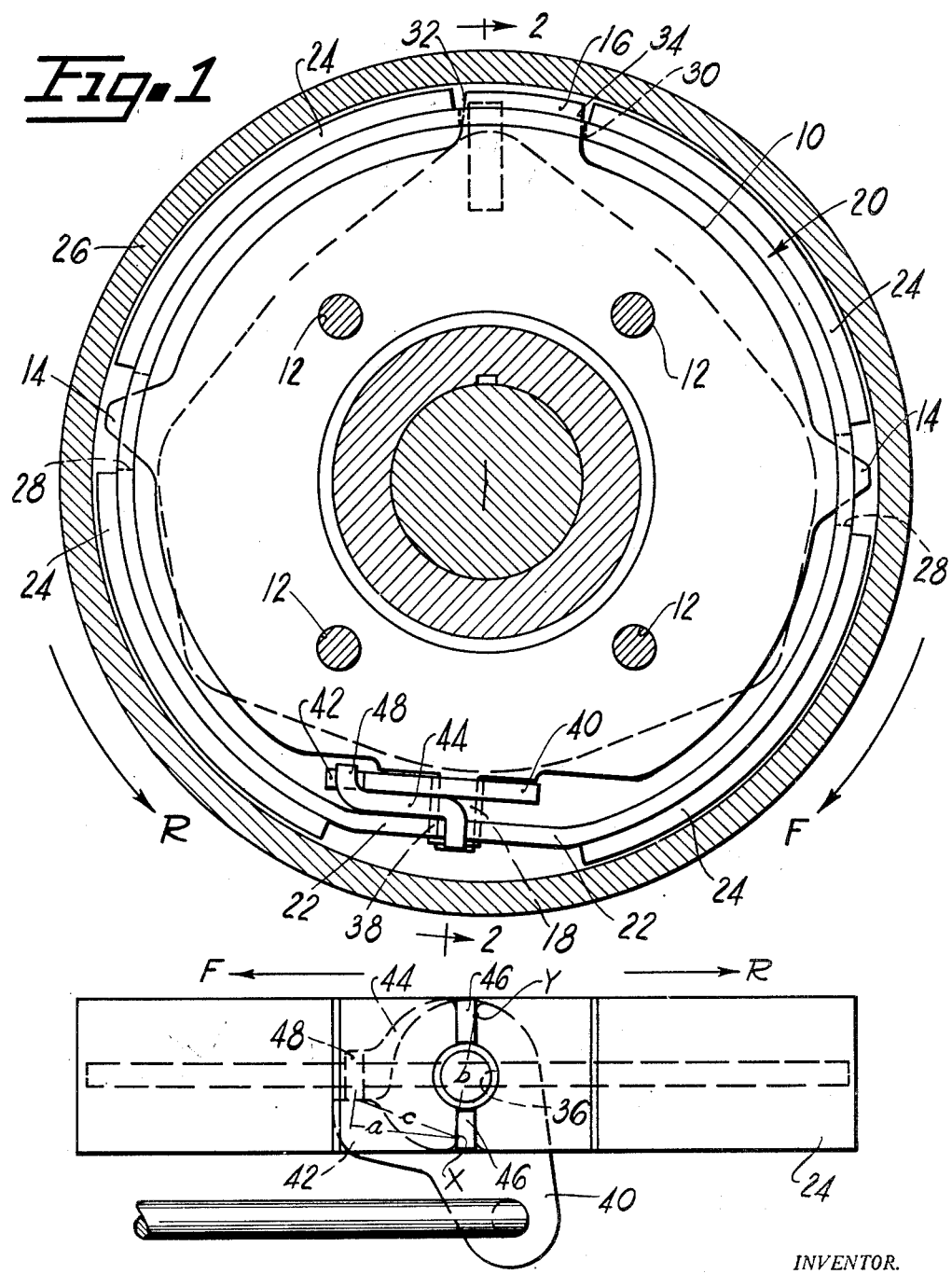
Figure 1 is a side elevation of an embodiment of the present invention.
Figure 2:
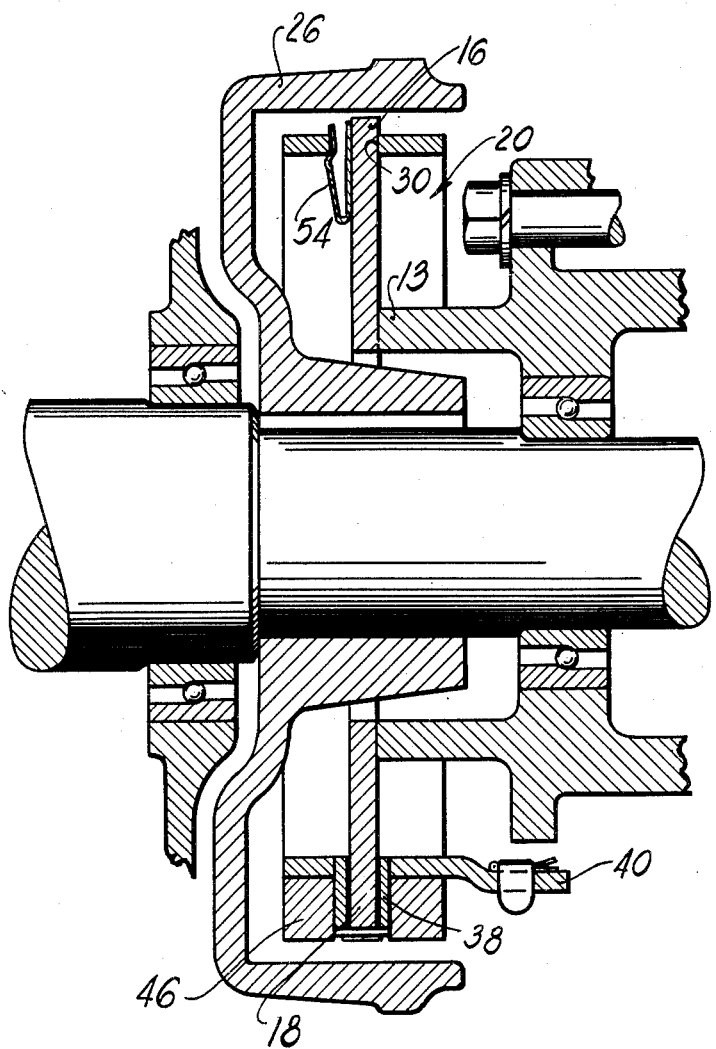
Figure 2 is a section taken on section line 2—2 of Figure 1.

Referring to the drawings and more particularly to Figures 1 and 2, an annular supporting plate 10 is provided with circumferentially arranged holes 12 by which the plate 10 may be secured to a non-rotatable part 13 of a vehicle or other device on which the present invention is used. A pair of radially outwardly extending ears 14 are formed on opposite sides of plate 10 and are circumferentially spaced from an anchor projection 16 preferably formed integral with plate 10. Diametrically opposite from anchor 16 is a radially outwardly projecting post or actuator pivot 18 which serves a purpose to be described later. With the supporting plate 10 thus constituted, it is obvious that the plate lends itself to simple mass production techniques, such as, for example, stamping or forging.

The next part of the brake assembly which likewise is of extremely simple design and easily produced is the brake shoe 20 which comprises essentially of nothing more than an annular band split on one side to provide separable ends 22. Friction lining 24 may be secured to the outer

2 surface of band 20 for engagement with a brake drum 26. The two radial slots 28 and the third slot 30 in band 22 receive therethrough the ears 14 and anchor 16, respectively, the slots 28 having a clearance length sufficient to allow the shoe to shift circumferentially during brake application, while the length of slot 30 is, as nearly as possible, coextensive with the circumferential dimension of anchor 16. Each of the two radial edges of anchor 16 may be shaved or smoothed by some suitable operation to provide the two anchor surfaces 32 and 34 which are slidably engaged by the respective ends of slot 30. The width dimensions of the slots 28 and 30 are substantially equal to the thickness of plate 10 thereby furnishing the necessary means for locating the shoe 20 on the plate 10.

Figure 4:
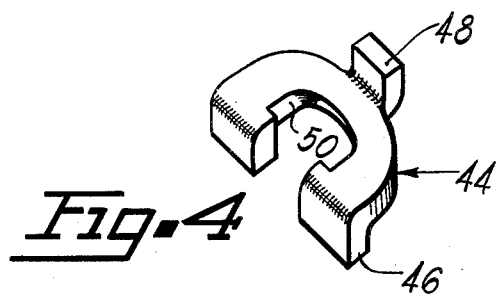
Figure 4 is an isometric view of a part of the mechanism of Figure 3.

The facing edges of shoe ends 22 are provided with complementary arcuate notches 36 which fit the outer cylindrical surface of a bushing 38 received on the post 18. An actuating lever 40 having an offset arm 42 is journaled on bushing 38, and a cam member 44 (see Figure 4) is interposed between the separable ends 22 as viewed in Figure 3, and between lever 40 and the shoe 20 as viewed more clearly in Figure 1.

Cam member 44 is a part of the actuating mechanism which acts on the shoe ends 22 directly to spread them apart and may be formed by a stamping operation. It is bifurcated with the ends of each furcation being bend to provide the lugs 46 which are interposed between shoe ends 22. The rear extremity of the cam 44 is bent upwardly or oppositely to the lugs 46 to form an abutment 48 which may be engaged by the actuator lever arm 42. The notch 50 formed between the lugs 46 is made sufficiently oversize so as to loosely straddle the bushing 38.

As viewed more clearly in Figure 3, the assembled actuating mechanism is so arranged that the centerline of symmetry through the cam 44 which bisects the lug 48 and the notch 50 is located in the median plane of the supporting plate 10 and the shoe 20. Thus the two dimensions from the abutment 48 to a corresponding point on each of the lugs 46 are substantially equal, a feature conducing to the desired results achieved by this invention. Stated in other words, the cam 44 is symmetrically designed so that it provides these desired results, and is usable in the brake regardless of whether the brake is to be used on either the left or right side of the vehicle or turned one hundred eighty degrees (180°) to that illustrated. This feature obviously conduces to economical production.

As will also be seen in Figure 3, the point of engagement between lever arm 42 and abutment 48 lies almost in the above mentioned median plane and actually close enough to achieve the intended result which is explained more fully hereinafter.

Figure 5:
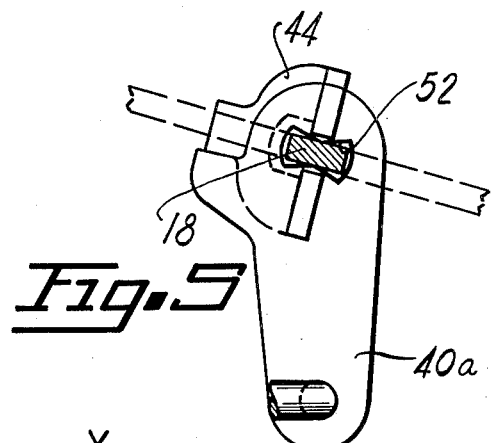
Figure 5 is a fragmental view of another embodiment of the present invention.

Referring now to Figure 5, a slight modification of the present invention is presented, the principal difference residing in the pivotal mounting of the actuating lever 40a on the supporting plate 10. This lever 40a is identical to lever 40 with the exception of the form of the pivot opening 52 which has a shape similar to an hour glass or figure 8, the waist or narrow dimension of this opening 52 being substantially equal to the thickness of post 18. In this embodiment, the bushing 38 is eliminated thereby eliminating an item of cost, the opening 52 providing the necessary clearance for lever 40a to be rocked to apply the brake.

In operation, assuming the drum to be rotating, the brake shoe 20 will be maintained in substantial concentricity with drum 26, since any contact between the shoe 20 and the drum shifts the former on its support 10 until no contact is present between the two. From the foregoing description, the shoe 20 may be characterized as floating on its support 10 since the ears 14 and slots 28, and the anchor 16 and slot 30 are substantially coextensive in widths whereby a slight frictional engagement is available to hold the shoe on its support 10 except when forced to move as by manual brake application or by contact with the drum.

In applying the brake, lever 40 is always rotated in a clockwise direction as viewed in Figure 3. Now assuming drum rotation to be in the direction of arrow F, an application of the lever 40 will impart clockwise rotational movement to cam 44. The cam lugs 46 thus rotated, the shoe ends 22 will be spread apart until the shoe 20 engages the drum. When such engagement occurs, the shoe will tend to wrap in the direction of drum rotation whereby the shoe end 22 to the left of pivot post 18 will actually move with the drum an amount corresponding to the clearance of the shoe from the drum and the degree of sliding engagement of the shoe with anchor surface 32. This moving shoe end 22 may be characterized as being a part of the leading half of shoe 20 while the remainder of the shoe may be characterized as a trailing half. It so happens that the end 22 which forms a part of the trailing half remains substantially stationary or solid so that rotational movement of cam 44 is accomplished about the uppermost lug 46 (as viewed in Figure 3) with the lower lug 46 actually moving with the shoe end.

For the opposite direction of drum rotation as indicated by the arrow R, the right hand shoe end 22 (as viewed in Figure 3) moves and the left hand end 22 remains stationary and serves as the cam fulcrum.

In each instance of drum rotation, the leading half of shoe 20 anchors on projection 16 so that with a given amount of spreading between ends 22, the braking force will be substantially constant regardless of the direction of drum rotation. The present invention accomplishes this equal braking effectiveness by the particular arrangement of the anchor and shoe spreading mechanism, the latter being so arranged that for a given angular movement of lever 40, the shoe ends 22 will be spread a corresponding amount irrespective, as mentioned above, of direction of drum rotation.

In actual tests, it has been found that a brake having substantially the same geometry as that of the foregoing disclosure, will provide equal braking effectiveness for both directions of drum rotation for a given angular movement of lever 40 or 40a. As lining wears, the point of engagement between abutment 48 and lever arm 42 moves toward the median plane of the brake assembly changing somewhat the geometry of the leverage ratios, however, this change does not produce a noticeable distinction between forward and reverse braking effectiveness.

If necessary, one part of the slot 30 may be widened to accept a hair-pin type of leaf spring 54 between the anchor 16 and shoe 20 to insure a frictional resistance against relative movement between shoe 20 and support 10.

Figure 6:
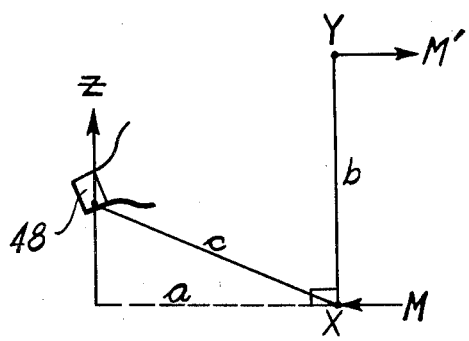
Figure 6 is a geometric illustration of a part of this invention.

In order to prove the theory of the above mentioned braking effectiveness, the following simple geometric explanation is given. Now comparing Figures 3 and 6 for similar lines of geometry, point "X" between the lower lug 46 and shoe end 22 represents the fulcrum of cam 44 for "R" direction of drum rotation and point "Y" between the other lug 46 and other end 22 represents the fulcrum of cam 44 for "F" direction of drum rotation. The length of the lever arm between points "X" and "Y" is represented by the letter "b" while the length "c" denotes the distance from point "X" to the point of engagement or force between actuating arm 42 and abutment 48.

Now in order to simplify this proof, assume that the component of force "Z" exerted by arm 42, is parallel to lever arm "b" and that the lever arm length through which this force "Z" acts to pivot the linkage about either point "X" or point "Y" is "a."

Taking as the first problem, rotation of the drum in direction "R," cam 44 will fulcrum at stationary point "X" and point "Y" will move. Letting M' represent the spreading force exerted at "Y," the expression $$Za = M'b$$

results. Solving for useful force M'

$$M' = Z\frac{a}{b}$$

Taking as the second problem, the forward direction of drum rotation "F," "Y" becomes the stationary fulcrum and "X" the movable point. Letting "M" equal the force exerted at "X," the force expression $$Za = Mb$$

or $$M = Z\frac{a}{b}$$

is obtained. Thus M' equals M or, in other words, the leverage ratio in each instance is $$\frac{a}{b}$$

For a given forceful angular movement of lever 40 or 40a, it is seen that the same leverage ratio and force prevails for spreading the shoe ends 22 apart for both directions of drum rotation.

Equal braking effectivness for the same degree of brake application movement facilitates control of the vehicle since an operator accustomed to a certain manual effort for forward braking torque will not experience a different degree of effort for a reverse situation requiring the same braking torque.

The function of this invention provides for complete interchangeability of the brakes without any fear of a difference in effectiveness between left and right-hand brakes. The only part necessary to alter, if any, is the lever 40 or 40a which may have to be formed oppositely to accommodate such interchanging. This obviously conduces to economy of manufacturing and of servicing.

Although only one embodiment of the invention has been illustrated and described, various changes in the form and relative arrangements of the parts may be made to suit requirements.

I claim:

1. For use in cooperation with a rotatable drum, a brake comprising a flat supporting plate which is adapted to be secured to a nonrotatable member and which has a radially outwardly extending anchor projection, an expansible annular band brake shoe having adjacent separable ends and a plurality of circumferentially spaced radial slots, a plurality of radially outwardly extending locating ears on said plate, said ears and said anchor projection extending into respective ones of said slots to laterally position said shoe on said plate, said anchor projection being spaced approximately diametrically from said separable ends, said shoe anchoring on said projection for either direction of rotation of the rotatable drum, a spring interposed between one side of said anchor projection and the respective slot for providing frictional support for said shoe on said supporting plate, a radially outwardly extending post provided on said plate approximately diametrically opposite said anchor and located between said separable ends, a bushing received on said post, a floating cam two shoe-spreading lugs straddling said post, and a manually operable lever journaled on said bushing and having an arm which engages and rotates said cam to spread said shoe ends, the point of engagement between said arm and said cam lying substantially in the plane of said supporting plate.

2. For use in cooperation with a rotatable drum, a brake comprising a flat supporting plate which is adapted to be secured to a non-rotatable member and which has a radially outwardly extending anchor projection, an expansible annular band brake shoe having adjacent separable ends and a plurality of circumferentially spaced radial slots, a plurality of radially outwardly extending locating ears on said plate, said ears and said anchor projection extending into respective ones of said slots to laterally position said shoe on said plate, said anchor projection being spaced approximately diametrically from said separable ends, said shoe anchoring on said projection for either direction of rotation of the rotatable drum, a spring interposed between one side of said anchor projection and the respective slot for providing frictional support for said shoe on said supporting plate, a radially outwardly extending post provided on said plate approximately diametrically opposite said anchor and located between said separable ends, a floating cam having two shoe-spreading lugs straddling said post, and a manually operable lever rockably supported on said post and having an arm which engages and rotates said cam to spread said shoe ends, the point of engagement between said arm and said cam lying substantially in the plane of said supporting plate.

3. For use in cooperation with a rotatable drum, a brake comprising a flat supporting plate which is adapted to be secured to a non-rotatable member and which has a radially outwardly extending anchor projection, brake shoe means having at least one set of adjacent separable ends, a plurality of radially outwardly extending locating ears provided on said plate and arranged to position said brake shoe means on said plate, said anchor projection being located approximately diametrically opposite said separable ends and arranged to take the anchor load of said brake shoe means for either direction of drum rotation, means provided to retain said brake shoe means on said supporting plate, a radially outwardly extending post provided on said plate approximately diametrically opposite said anchor and located between said separable ends, a floating cam having two shoe-spreading lugs straddling said post, and a manually operable lever rockably supported on said post and having an arm which engages and rotates said cam to spread said shoe ends, the point of engagement between said arm and said cam lying substantially in the plane of said supporting plate.

4. For use in cooperation with a rotatable drum, a brake comprising a flat supporting plate which is adapted to be secured to a non-rotatable member and which has a radially outwardly extending anchor projection, an expansible annular brake shoe having adjacent separable ends, said anchor projection being located approximately diametrically from said ends, said shoe having a sliding engagement with said anchor projection for either direction of drum rotation whereby said shoe will be self-centering with respect to said drum, means supporting said shoe on said plate, a radially outwardly extending post provided on said plate approximately diametrically opposite said anchor and located between said separable ends, a floating cam having two shoe-spreading lugs straddling said post, and a manually operable lever rockably supported on said post and having an arm which engages and rotates said cam to spread said shoe ends, the point of engagement between said arm and said cam lying substantially in the plane of said supporting plate.

5. For use in cooperation with a rotatable drum, a brake comprising a supporting member provided with a pair of adjacent oppositely facing anchor surfaces, an annular band type brake shoe carried by said supporting member and having adjacent separable ends disposed approximately diametrically opposite said anchor surfaces, said shoe being arranged to slidingly engage one or the other of said surfaces depending upon the direction of drum rotation whereby said shoe may center itself with respect to said drum, a radially outwardly extending post provided on said supporting members approximately diametrically opposite said anchor surfaces and located between said separable ends, said anchor surfaces, the median plane of said shoe, and said post being substantially coplanar, a floating cam having two shoe-spreading lugs on opposite sides of said post and between said ends, and a lever pivotally supported on said post and having a portion in engagement with said cam whereby said cam may be rotated to spread said shoe ends, the point of engagement between said cam and said lever lying substantially in the aforementioned plane of said shoe.

6. For use in cooperation with a rotatable drum, a brake comprising a supporting member provided with a pair of adjacent oppositely facing anchor surfaces, an annular band type brake shoe carried by said supporting member and having adjacent separable ends disposed approximately diametrically opposite said anchor surfaces, said shoe being arranged to slidingly engage one or the other of said surfaces depending upon the direction of drum rotation whereby said shoe may center itself with respect to said drum, a radially outwardly extending post provided on said supporting member approximately diametrically opposite said anchor surfaces and located between said separable ends, a floating cam having two shoe-spreading lugs on opposite sides of said post and between said ends, and a lever pivotally supported on said post and having a portion in engagement with said cam whereby said cam may be rotated to spread said shoe ends to frictionally apply said shoe to the drum.

7. For use in cooperation with a rotatable drum, a brake comprising a supporting member provided with a pair of adjacent oppositely facing anchor surfaces, an annular band type brake shoe carried by said supporting member and having adjacent separable ends disposed approximately diametrically opposite said anchor surfaces, said shoe being arranged to slidingly engage one or the other of said surfaces depending upon the direction of drum rotation whereby said shoe may center itself with respect to said drum, a radially outwardly extending post provided on said supporting member approximately diametrically opposite said anchor surfaces and located between said separable ends, a floating cam member interposed between said shoe ends for spreading same apart, and an actuating lever pivoted on said post and having a portion in engagement with said cam member whereby said cam member may be moved to spread said shoe ends, said lever and said cam member being so arranged that a given actuating movement of said lever will provide substantially equal braking torque for either direction of drum rotation.

8. For use in cooperation with a rotatable drum, a brake comprising a supporting member, a band type brake shoe carried by said supporting member and having adjacent separable ends, said supporting member having an anchor which is slidingly engaged by said brake shoe and which is positioned substantialy diametrically opposite said separable ends, a radially outwardly extending projection provided on said supporting member and located adjacent the space between said separable ends, a floating cam member interposed between said shoe ends for spreading same apart, and an actuating member supported on said projection and having a portion in engagement with said cam member whereby said cam member may be moved to spread said shoe ends apart, said actuating member and said cam member being so arranged that a given actuating movement of said actuating member will provide substantially equal braking torque for either direction of drum rotation.

9. A brake comprising a band type friction element having separable ends, a supporting member arranged to support said friction element and providing an anchor portion for said friction element diametrically across from said ends, a cam member interposed between said ends and arranged to spread same apart, and an operating lever pivotally supported on said supporting member in a plane substantially normal to a radius of said brake and having a portion arranged to engage and actuate said cam member, said cam member and said lever being so arranged that a given actuating movement of said actuating member will provide substantially equal braking torque for either direction of drum rotation.

10. A brake comprising a supporting plate having an anchor portion, a friction element arranged to anchor on said anchor portion and having its ends adjacent each other, a floating cam member supported in such a manner to spread said ends apart to apply the brake, and an actuating lever pivoted on an axis substantially coplanar with said plate and having a portion arranged to engage said cam member to spread said ends, said cam member and said lever being so arranged that a given actuating movement of said lever will provide substantially equal braking torque for either direction of drum rotation.

11. For use in cooperation with a rotatable drum, a brake comprising a substantially flat backing plate, positioning and anchoring means integral with said backing plate, a post substantially opposite said anchoring means, an annular band type brake shoe supported by said backing plate, actuating means pivotally mounted on said post, a rotatable lever and a bifurcated cam engaging each other in substantially the same plane as said backing plate, said cam being capable of rotation about either of its opposite sides in engagement with said shoe.

12. For use in cooperation with a rotatable drum, a brake comprising a flat supporting plate which is adapted to be secured to a nonrotatable member and which has a radially outwardly extending anchor projection, an expansible annular band brake shoe having adjacent separable ends and a plurality of circumferentially spaced radial slots, a plurality of radially outwardly extending locating ears on said plate, said ears and said anchor projection extending into respective ones of said slots to laterally position said shoe on said plate, said anchor projection being spaced approximately diametrically from said separable ends, said shoe anchoring on said projection for either direction of rotation of the rotatable drum, a radially outwardly extending post provided on said plate approximately diametrically opposite said anchor and located between said separable ends, a floating cam having two shoe-spreading lugs straddling said post, and a manually operable lever journaled on said bushing and having an arm which engages and rotates said cam to spread said shoe ends, the point of engagement between said arm and said cam lying substantially in the plane of said supporting plate.

13. For use in cooperation with a rotatable drum, a brake comprising a flat supporting plate which is adapted to be secured to a nonrotatable member and which has a radially outwardly extending anchor projection, an expansible brake shoe having adjacent separable ends and a plurality of circumferentially spaced radial slots, a plurality of radially outwardly extending locating ears on said plate, said ears and said anchor projection extending into respective radial slots to laterally position said shoe on said plate, said anchor projection being spaced approximately diametrically from said separable ends, a spring interposed between one side of said anchor projection and the respective slot for providing frictional support for said shoe on said supporting plate, a radially outwardly extending post provided on said plate approximately diametrically opposite said anchor and located between said separable ends, a bifurcated cam fulcrumed at either of its opposite ends, and a manually operable lever rockably supported on said post and having an arm which engages and rotates said cam to spread said shoe ends, the point of engagement between said arm and said cam lying substantially in the plane of said supporting plate.

EDWARD K. DOMBECK.

References Cited in the file of this patent

UNITED STATES PATENTS

| Number | Name | Date |
|---|---|---|
| 717,836 | Gabriel | Jan. 6, 1903 |
| 1,990,252 | Ragsdale et al. | Feb. 5, 1935 |
| 1,994,813 | Dodge | Mar. 19, 1935 |
| 2,077,914 | Axtmann | Apr. 20, 1937 |
| 2,206,742 | Dodge | July 2, 1940 |